2,809,190

PROCESS OF PREPARING ESTERS OF N-CARBAMYLFUMARAMIC ACID

Robert J. Kelly, Rutherford, and Carl E. Bryan, Fairlawn, N. J., assignors to United States Rubber Company, New York, N. Y., a corporation of New Jersey No Drawing. Application November 30, 1953, Serial No. 395,284

4 Claims. (Cl. 260—211)

This invention relates to trans N-carbamylamic esters derived from intramolecular anhydrides of cis 2-butenedioic acids.

We have discovered that a new class of chemicals, the N-carbamylimides derived from the cis 2-butenedioic acids, react easily, in the presence of certain cis-trans isomerizing agents, with compounds which contain one or more non-tertiary carbinol groups, i. e., primary or secondary alcoholic hydroxyl groups, to form the corresponding esters of unsaturated trans N-carbamylamic acids. The reagent carbinol compounds hereinafter are called alcohols, regardless of the presence or absence of other substituent groups. The ease with which the imide ring is opened in the new reaction is entirely unexpected in view of the known stability, toward alcohols, of the similar heterocyclic rings present in maleimide and phthalimide and their N-alkylated and N-arylated derivatives; many of the known cyclic imides can actually be purified by recrystallization from alcohols without change.

Alternatively, we can prepare the trans N-carbamylamic esters from the corresponding cis esters by the action of an isomerizing agent, and we consider this process to be a part of our invention. However, for economic reasons we usually prefer to prepare the trans esters directly from the alcohol and the N-carbamylimide in one operation.

The N-carbamylimides which we employe in our reaction have the structure

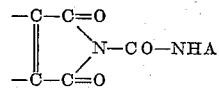

wherein A is hydrogen or a hydrocarbon group, and the remaining bonds are satisfied by hydrogen or acyclic hydrocarbon groups. These new N-carbamylimides are prepared, as shown in detail hereinafter and in a copending application by Robert H. Snyder, Serial No. 367,108, filed July 9, 1953, which is a continuation-in-part of his application Serial No. 312,870, filed October 2, 1952, and now abandoned, from the corresponding N-carbamylamic acids.

Typical N-carbamylimides which are operable in our invention are N-carbamylmaleimide, N-carbamylcitraconimide, N-carbamyl-alpha-ethylmaleimide, N-carbamyl-dimethylmaleimide, N-(methylcarbamyl)-maleimide, N - (n - butylcarbamyl) - maleimide, N - (tert. - butylcarbamyl) - maleimide, N - (cyclohexylcarbamyl) - maleimide, N - (phenylcarbamyl) - maleimide, N - (tert.-butylcarbamyl) - citraconimide and N - (phenylcarbamyl)-citraconimide. These yield, by the process of our invention, the corresponding trans esters, viz., the N-carbamylfumaramates, the N-carbamylmesaconamates, the N - carbamyl - alpha - ethylfumaramates, and the N-carbamyldimethylfumaramates. N - carbamylmaleimide is the preferred intermediate, and the preferred trans N-carbamylamic esters of this invention are the N-carbamylfumaramates. Therefore, N - carbamylmaleimide and the esters made therefrom will be used hereinafter in describing and illustrating our invention, except where otherwise stated specifically.

The formation of the N-carbamylfumaramates is illustrated as follows:

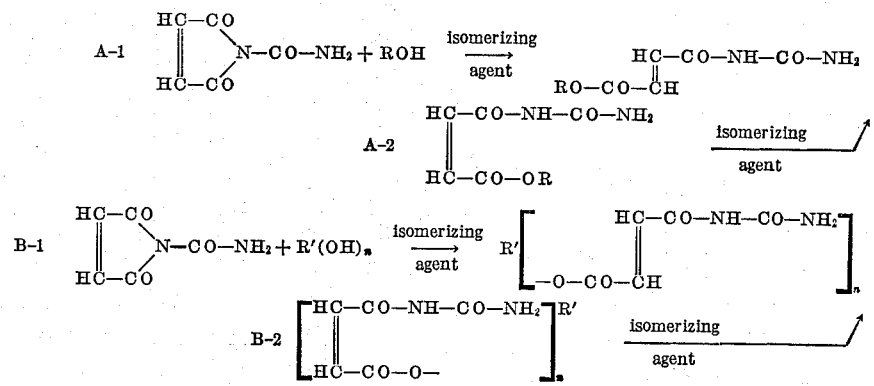

wherein R and R' are the residues of non-tertiary alcohols, which can contain one or more additional hydroxyl groups not involved in the esterification reactions A and B. The symbol $n$ is an integer.

The N-carbamylfumaramic esters are formed simply, either directly from N-carbamylmaleimide and an alcohol, as shown in Equations A–1 and B–1, or via the intermediate maleuric esters, as shown in Equations A–2 and B–2, in an appropriate solvent and in the presence of an isomerizing agent. This solvent usually is the alcohol taking part in reaction A–1 or B–1, an excess being used over that converted to the ester.

However, when the reagent alcohol is one which boils at a very high temperature at atmospheric pressure, we prefer to use the alcohol in little or no excess over that amount needed in the esterification, and to use with it an inert solvent which boils at a lower temperature than the alcohol, thereby simplifying the process of purifying the ester. Furthermore, in the special cases in which we wish to react N-carbamylmaleimide with substantially all of the hydroxyl groups of a liquid polyhydric alcohol, or in which the alcohol is a solid which melts or decomposes above about 140° C., the use of an inert solvent is essential because the N-carbamylmaleimide, the alcohol, and/or the desired product normally are solid materials. p-Dioxan is a suitable solvent.

The temperature of the esterification and/or isomerization can be varied over a wide range, e. g., from about room temperature (20° C.) to about 140° C. The more active alcohols such as methanol and ethanol will react with N-carbamylmaleimide within a few minutes at room temperature, especially when the mixture is stirred rapidly. The higher monohydric alcohols, e. g., 1-dodecanol, and the polyhydric alcohols react with N-carbamylmaleimide less rapidly, so that it is essential to heat the reaction mixture in order to carry out the esterification in a reasonable length of time. Above about 140° C. the yield of the desired ester decreases rapidly because of decomposition of N-carbamylmaleimide. For highest yield and purity of the ester we prefer to hold the reaction temperature below about 110° C.

It is advisable to use substantially anhydrous reagents and solvents in our reaction because N-carbamylmaleimide reacts with water to form N-carbamylmaleamic acid. This competing hydrolysis reaction usually appears to be at least as rapid as the desired esterification. Once the N-carbamylmaleamic acid is formed it cannot be esterified directly. Consequently, while we can obtain a substantial yield of, for example, ethyl N-carbamylfumaramate from 95% ethyl alcohol, we prefer to use absolute alcohol for maximum yield and purity of the ester.

Typical alcohols which are operable in our invention are the monohydric aliphatic alcohols, e. g., methanol, ethanol, 1-propanol, 2-propanol, 1-butanol, 2-ethylhexan-1-ol, 1-dodecanol, 1-octadecanol; the unsaturated alcohols, e. g., allyl alcohol and methallyl alcohol; the halogenated alcohols, e. g., ethylene chlorohydrin; the ether-acohols, e. g., ethylene glycol monomethyl ether and diethylene glycol monoethyl ether; the cycloalkyl alcohols, e. g., cyclohexanol; the aralkyl alcohols, e. g., benzyl alcohol; the tertiary-amino alcohols, e. g., triethanolamine; the cyanoalcohols, e. g., beta-cyanoethanol; the alcohols formed by reduction of the carbon monoxide-olefin products made by the "oxo" process; the hydroxy acids and esters, e. g., glycolic acid; the polyhydric alcohols, e. g., ethylene glycol, the polyethylene glycols, polymeric alcohols which have been formed by oxidizing and then partially reducing isoolefin:conjugated diolefin copolymers, alkyd resins having terminal alcoholic hydroxyls, glycerol, pentaerythritol, cellulose, starch, glucose, sucrose, s rbitol, polyvinyl alcohol, and partial ethers and esters thereof; monoglycerides; diglycerides; triglycerides containing one or more alcoholic hydroxyl groups, e. g., cast r oil and "blown" oils such as soya and linseed oils; methylol phenols, e. g., 2,6-dimethylol-4-alkyl-phenols and their condensation polymers; N-methylol compounds, e. g., N-methylolmaleimide and N,N'-dimethylolurea; and alcohols containing sulfone groups, e. g., those alcohols made from a glycol and divinyl sulfone. Tertiary alcohols are not operable in our invention.

The N-carbamylfumaramic esters fall into two very different groups: those from monohydric alcohols, and those from polyhydric alcohols. As shown by P. O. Tawney in a copending application Serial No. 395,282, filed November 30, 1953, now U. S. Patent No. 2,721,186, the trans N-carbamylamic esters can be polymerized to form useful resins. While all of the trans N-carbamylamic esters will form such polymers, the trans N-carbamylamic esters of polyhydric alcohols have a distinctive property not possessed by trans N-carbamylamic esters of monohydric alcohols; namely, the extremely useful ability to form crosslinked heteropolymers which can form thermosettable coatings and castings which do not craze or shrink.

This valuable property can be used, for example, to make materials which are similar to, but superior to, polystyrene. This resin is one of the most useful of plastic materials. It is cheap, transparent, capable of being dyed to form beautiful, clear articles in many color shades, easily and rapidly moldable into any of many desirable shapes, etc. However, it has three major deficiencies; namely, it is soluble in many organic liquids, it is a permanently thermoplastic material which softens at so low a temperature that articles made from it cannot be used above about 90° C. and it is brittle. Tawney has further shown that these defects can be overcome by copolymerizing styrene with one, or a mixture of several trans N-carbamylamic esters of polyhydric alcohols. Presumably, this improvement is due to the formation of a three-dimensional macromolecular structure. As styrene is only difunctional, it cannot homopolymerize to form such a structure. However, an ester containing at least two trans N-carbamylamic groups is tetrafunctional, i. e., it can react with a difunctional monomer to form three-dimensional, i. e., crosslinked materials.

In making such crosslinked heteropolymers, Tawney prefers to use trans N-carbamylamic esters of a particular type of polyhydric alcohol; namely, an alkyd resin having terminal alcoholic hydroxyl groups. He has found that di-(N-carbamylfumaramic) esters made from such alkyds are especially useful for making tough and rigid or slightly flexible solid heteropolymers.

The alkyd resin used in his invention can be made from any polycarboxylic acid, or mixture thereof, and any polyhydric alcohol or mixture thereof, provided only that the reaction conditions and the proportions of the acidic and alcoholic reagents are such as to cause the alkyd chains to terminate with free hydroxyl groups rather than with free carboxyl groups. Such alkyd resins and methods for making them are, of course, well known.

Typical polycarboxylic acids which can be used in making alkyds suitable for use in Tawney's invention are succinic acid, glutaric acid, adipic acid, pimelic acid, suberic acid, sebacic acid, maleic acid, citric acid, citraconic acid, itaconic acid, aconitic acid, phthalic acid, isophthalic acid, terephthalic acid, 3,6-endomethylene-1,2,3,6-tetrahydrophthalic acid and mixtures thereof. The anhydrides of these acids, when available, are equivalent to the acids in making alkyds, and are generally used commercially in preference to the acids for economic reasons.

Typical polyhydric alcohols used in making the alkyds are ethylene glycol, propylene glycol, diethylene glycol, glycerol, 1,2,4-butanetriol, and mixtures thereof.

The N-carbamylimides used in our invention are made, as described in a copending application by Snyder, Serial No. 367,108, filed July 9, 1953, which is a continuation-in-part of his application, Serial No. 312,870, filed October 2, 1952 (now abandoned), from the corresponding N-carbamylamic acids. Each of these is made from the anhydride of the appropriate dicarboxylic acid and a urea. A preferred method of carrying out the latter reaction is described in a copending, but now abandoned, application by Snyder, Serial No. 312,869, filed October 2, 1952. His method of making the N-carbamylamic acids and the N-carbamylimides therefrom is illustrated as follows:

A solution of 500 g. of maleic anhydride and 300 g. of urea in 1000 ml. of glacial acetic acid is heated at 50° C. for 12 hours, during which time maleuric acid begins to crystallize. The mixture is allowed to cool and is left overnight at room temperature. Then the white crystalline product is filtered, washed with glacial acetic acid, and dried at 50° C. The maleuric acid, 405 g. or 56% of theory, melts at 161–162° C. with decomposition.

Similarly, a urea is reacted in glacial acetic acid with an equivalent amount of an intramolecular anhydride of another alpha-olefinic alkenedioic acid to give the appropriate N-carbamylamic acid. Typical N-carbamylamic acids are the following:

N-carbamylcitraconamic acid, M. P. 145–149° C., N-(n-butylcarbamyl)-maleamic acid, M. P. 105.5–107.0° C., N-(tert.-butylcarbamyl)-maleamic acid, M. P. 151.5–153.5° C., and N-(phenylcarbamyl)-maleamic acid, M. P. 162–163° C.

The anhydrides from which the N-carbamylamic acids are made are intramolecular and are derived from the corresponding cis alpha-butenedioic acids.

Typical anhydrides are maleic anhydride, citraconic anhydride, alpha-ethylmaleic anhydride, and dimethylmaleic anhydride.

The ureas from which the N-carbamylamic acids are made are urea itself ($NH_2-CO-NH_2$) and N-mono-hydrocarbon-substituted ureas. This substituent can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-secbutylurea, N-isobutylurea, N-tert-butylurea, the N-amylureas, N-n-hexylurea, N-n-heptylurea, N-n-octylurea, N-(2-ethylhexyl)-urea, N-n-nonylurea, N-n-dodecylurea and N-n-octadecylurea. Typical alkenyl ureas are N-allylurea, N-methallylurea and N-crotylurea. A typical cycloalkylurea is N-cyclohexylurea. A typical terpenylurea is N-bornylurea. Typical aralkylureas are N-benzylurea and N-phenethylurea. Typical aryl ureas are N-phenylurea, the three N-tolylureas and the two N-naphthylureas.

These N-carbamylamic acids are converted to the corresponding N-carbamylimides, as illustrated with maleuric acid:

A mixture of 50 parts of maleuric acid and 120 parts of glacial acetic acid is heated to about 80° C. Acetic anhydride (50 parts) is added gradually to the stirred mixture, which is held at the same temperature until practically all of the suspended maleuric acid has disappeared. The hot solution is filtered, and cooled to room temperature, causing crystallization of a white product. This material, the new compound N-carbamylmaleimide, melts at 157–158° C.

Similarly, each of other typical N-carbamylamic acids is converted to the corresponding N-carbamylimide:

N-carbamylcitraconimide, M. P. 110–115° C.; N-(n-butylcarbamyl)-maleimide, M. P. 66.5–68.0° C. (this white compound did not crystallize until the solution was evaporated in vacuo to about half volume; it was recrystallized from a mixture of benzene and Skellysolve B—a petroleum fraction which is chiefly n-hexane); N-(tert-butylcarbamyl)-maleimide, M. P. 106.0–107.5° C. (this white compound also did not crystallize until the solution was evaporated in vacuo to half volume; it was recrystallized from carbon tetrachloride); N-(phenylcarbamyl)-maleimide, M. P. 140–141° C. (this pale yellow compound was recrystallized from benzene).

The cis-trans isomerizing agent used in our invention is selected from the class consisting of aluminum chloride; strong mineral acids such as sulfuric acid, hydrochloric acid and hydrobromic acid; and the non-tertiary amines. However, these isomerizing agents are not entirely equal among themselves as regards activity and efficiency.

Our preferred agent is aluminum chloride because it effects isomerization rapidly and completely; i. e., without undesirable side reactions. When the trans esters are prepared directly from an alcohol and an N-carbamylimide we prefer to use anhydrous aluminum chloride to prevent the above mentioned undesirable reaction between water and the imide. However, when the trans esters are prepared from the corresponding cis esters we can use either the hydrated form or the anhydrous form of aluminum chloride optionally.

The strong mineral acids are much less active catalysts than aluminum chloride; i. e., the isomerization is very much slower, and much more of the acid is needed.

The amines vary greatly in catalytic activity, but in general they are much less active than aluminum chloride. They also usually give a much lower yield of the trans isomer because of undesirable competing reactions. In particular, they are suitable ordinarily only for isomerizing the preformed cis esters to the corresponding trans esters because many of the amines react with the N-carbamylimides to give other materials at the expense of the cis esters, i. e., not only is the yield of the trans ester lowered but also the catalyst for isomerization is inactivated.

When aluminum chloride is used as the catalyst, either in the combined esterification-isomerization reaction or in the isomerization reaction alone, we have found that as little as about 0.5 part of the catalyst per 100 parts of the N-carbamylimide sometimes is adequate. However, in order to accelerate the esterification as well as the isomerization we sometimes use as much as 10 parts of the catalyst with alcohols which are sluggish in reacting with the N-carbamylimide. In general, we prefer to use between one and eight parts of aluminum chloride. These amounts are exclusive of any water of hydration which may be present.

When the strong mineral acids are used, we customarily need a minimum of about 5 parts, exclusive of water, to effect isomerization in any reasonable time.

The primary and secondary amines, our least preferred class of catalysts, vary so much in their ability to effect isomerization that no generalizations can be made. However, none are nearly as active as the aluminum chloride.

In contrast, such compounds as zinc chloride, ferric chloride and cadmium chloride do not isomerize these cis esters to the corresponding trans esters.

The following examples illustrate our invention. All parts are by weight:

*Example 1*

Anhydrous aluminum chloride (0.2 part) was added to a mixture of 5.0 parts of N-carbamylmaleimide and 50 parts of methanol. These was an immediate evolution of heat, and within a minute or two a white crystalline material precipitated. This material, methyl N-carbamylfumaramate, after recrystallization from water, melted at 228–230° C.

*Analysis.*—Calcd. for $C_6H_8N_2O_4$: nitrogen, 16.29%. Found: nitrogen, 16.18%

*Example 2*

Anhydrous aluminum chloride (0.6 part) was dissolved in 100 parts of methanol. Then 14.0 parts of powdered N-carbamylamaleimide was added to the solution. Within a minute or two the white N-carbamylfumaramate began to crystallize from the solution, and heat was evolved. During the next hour the mixture was stirred intermittently. At the end of this period the reaction appeared to be over. The liquid, which had been cloudy because of the formation of tiny crystals of the ester, became clear, and the ester settled quickly to the bottom. It was then filtered, washed with alcohol and ether, and dried. The yield of methyl N-carbamylfumaramate was 14.5 parts, or 84.3% of theory.

Examples 1 and 2 illustrate our preferred method of preparing trans N-carbamylamic esters. These examples also show that the order of mixing is not critical.

*Example 3*

Anhydrous aluminum chloride (0.01 part) was added to a solution of 0.5 part of methyl maleurate in 5 parts of methanol. There was an immediate evolution of heat, and a white crystalline product precipitated. This product, after recrystallization from water, melted at 225–230° C. A mixed melting point showed that it was identical with the methyl N-carbamylfumaramate described in Example 1.

Examples 1–3 show that aluminum chloride is an extremely active catalyst in forming the trans N-carbamylamic esters. Each of the two alternate processes shown in these three examples is applicable to the preparation of all the trans N-carbamylamic esters. Of course, as already mentioned, the reaction conditions, e. g., the solvent, time and temperature of reaction, vary with variation of the reagents.

The experiment of Example 3 when repeated on a larger scale showed the yield of methyl N-carbamylfumaramate to be quantitative.

*Example 4*

A mixture of 5.6 parts of N-carbamylamaleimide and 32 parts of ethylene chlorohydrin was heated on the steam bath. The solution became homogeneous within 30 minutes. Then, as heating was continued, a white solid began crystallizing. At the end of 5 hours total heating the mixture was cooled to room temperature, filtered, washed with ether and dried in vacuo. The yield of 2-chloroethyl N-carbamylfumaramate was 5.7 parts, or 65% of theory. It melted at 180–188° C. After recrystallization from methanol it melted at 189.5–190.5° C., and showed an ultra-violet absorption peak at 2200 A.

*Analysis.*—Calcd. for $C_7H_9N_2O_4Cl$: nitrogen, 12.68%. Found: nitrogen, 12.62%, 12.59%.

As no isomerization catalyst had been added deliberately, it had been expected that the cis ester, 2-chloroethyl N-carbamylmaleamate, would be formed. However, the cis ester melts at 116–119° C., and is much more soluble in organic solvents than the trans ester. Furthermore, all of the trans N-carbamylamic esters which have been analyzed with ultra-violet light show an absorption peak at about 2200 A., whereas the corresponding cis esters show the peak below 2000 A. This agrees with the observation by Wassermann and Smakula, Z. physik. Chem., Section A, 155, 368 (1931), that dimethyl fumarate shows a peak at about 2150 A., while dimethyl maleate shows a peak at about 1900 A.

The lot of ethylene chlorohydrin used in this example was then found to contain a considerable amount of hydrogen chloride dissolved in it. This hydrogen chloride was the isomerization catalyst.

Example 5

2-chloroethyl N-carbamylamaleamate (0.2 part) was dissolved in 5 parts of dioxane, and 0.01 part of aluminum chloride was added. The solution was heated on the steam bath for 30 minutes, and was then mixed with water. The white material so precipitated was filtered and recrystallized from methanol. It melted at 186–189° C. A mixed melting point with the 2-chloroethyl N-carbamylfumaramate of Example 4 showed the identity of the two products.

Example 6

To a mixture of 100 parts of N-carbamylmaleimide, 93 parts of 2-nitro-1-butanol and 150 parts of dioxan was added 6.0 parts of aluminum chloride. The stirred mixture was heated for 2½ hours at 85–90° C. At the end of the first 1¼ hours additional dioxan (250 parts) was added because so much solid material had separated. The solid was filtered while hot, and washed with dioxan and then was suspended in dilute aqueous hydrochloric acid in order to remove any unreacted N-carbamylamaleimide. The light tan product was filtered, washed with water, and dried. The yield of 2-nitro-butyl N-carbamylfumaramate, melting at 214–216° C., was 72.3 parts, or 39% of theory.

*Analysis.*—Calcd. for $C_9H_{13}N_3O_6$: nitrogen, 16.3%. Found: nitrogen, 16.89%, 16.90%.

Example 7

A stirred mixture of 140 parts of N-carbamylmaleimide, 238 parts of technical grade n-dodecanol, 10 parts of aluminum chloride and 500 parts of dioxan was heated at 85–90° C. for two hours, and then was poured into 2500 parts of water to precipitate an oily solid. This solid was filtered and then suspended in stirred 95% ethyl alcohol in order to separate the ester from the excess dodecanol. The ester was then filtered, washed with alcohol, and dried. The n-dodecyl N-carbamylfumaramate, an off-white solid melting at 152–157° C., was obtained in 49% yield, or 160 parts.

Example 8

2-hydroxyethyl maleurate was isomerized by aluminum chloride in ethylene glycol to 2-hydroxyethyl N-carbamylfumaramate during heating for 30 minutes on the steam bath. The white product melted at 173–183° C.

Example 9

2-propyl maleurate was isomerized to 2-propyl N-carbamylfumaramate by the method shown in Example 8, except that the solvent was 2-propanol, and the heating was done under a reflux condenser. The white product melted at 170–180° C.

Examples 6–9 show several other trans N-carbamylamic esters made by the action of aluminum chloride, our preferred catalyst.

Example 10

To a solution of 1.0 part of methyl maleurate in 3.0 parts of acetic acid was added 0.1 part of concentrated sulfuric acid. The solution was heated at 100° C. Within a few minutes methyl N-carbamylfumaramate began to crystallize. Heating was continued for a few minutes longer and then the mixture was cooled and filtered. The product was washed with a little acetic acid and dried. The yield of methyl N-carbamylfumaramate was quantitative, M. P. 218–224° C. A mixed melting point showed that it was identical with the new ester formed in Example 1.

Example 11

To a warm solution of 5 parts of n-butyl maleurate in 20 parts of acetic acid was added 0.5 part of concentrated sulfuric acid. The solution was heated at 80–90° C. for several minutes, and was then left overnight at room temperature. The white, crystalline N-butyl N-carbamylfumaramate was filtered, washed with acetic acid, and dried. Yield 3.0 parts, or 60% of theory; melting point 166–168° C.

Examples 10 and 11 illustrate the use of sulfuric acid as an isomerizing agent in our invention. They also show that an organic acid e. g., acetic acid, can be used as the reaction medium in isomerizing a cis ester to the corresponding trans ester, although not usable as the medium in our preferred method, because the acid and the alcohol would react to form a conventional ester simultaneously with the desired reaction between the alcohol and the N-carbamylimide.

Example 12

In order to compare directly the various types of catalysts used in our invention, each of five catalysts, 0.2 part, exclusive of any water with the catalyst, was dissolved separately in 50 parts of methanol. Then powdered N-carbamylmaleimide, 5.0 parts, was added to each solution. The solutions were shaken intermittently at room temperature. Disappearance of the solid N-carbamylmaleimide was taken to indicate the completion of the formation of methyl maleurate. (Experiments not involving isomerization showed this assumption to be justified.) As methyl N-carbamylfumaramate is soluble in methanol to the extent of less than 0.5% by weight, whereas methyl maleurate is quite soluble, the first appearance of crystals was taken to be evidence of incipient isomerization of the cis ester to the trans ester. (Methyl N-carbamylfumaramate crystals look quite different from N-carbamylmaleimide powder.) The two solutions containing aluminum chloride became somewhat warm during the reaction. The others showed no heat evolution perceptible to the hand, and consequently catalyst was added at the end of the first two hours, as noted individually. Each solution was filtered after 22 hours at room temperature to remove the methyl N-carbamylfumaramate. This was washed with methanol, and then with ether, and dried at 110° C. The filtrates from experiments C, D, E; i. e., those catalyzed by materials other than aluminum chloride, slowly precipitated more methyl N-carbamylfumaramate. This was filtered after three days additional standing, and was treated like the first crop. Still more of the ester continued to precipitate very slowly from the second filtrate of experiment E, and was filtered after a total time of 43 days. Even more ester precipitated exceedingly slowly from the third filtrate of experiment E, but it was not weighed. The effect of the several catalysts is shown as follows:

| Experiment | A | B | C | D | E |
|---|---|---|---|---|---|
| Catalyst | AlCl₃ | AlCl₃·6H₂O | ᵃHCl | ᵇH₂SO₄ | ᶜPiperidine |
| Time to solution of all of imide (min.) | 20 | 50 | 45 | 120 | 30 |
| Time to first precipitation of trans ester (min.) | 4 | 10 | 120 | 160 | 130 |
| Time to apparent completion of reaction (min.) | 30 | 50 | 5,760 (4 days) | 5,760 | >61,920 (43 days) |
| Percentage yield: | | | | | |
| (first crop) | 100 | 93 | 57 | 57 | 7 |
| (second crop) | none | none | 17 | 12 | 3 |
| (third crop) | none | none | none | none | 42 |
| (total) | 100 | 93 | 74 | 69 | 52 |

ᵃ After 2 hours, 1.7 parts of 36% HCl added, making a total of 2.2 parts of 36% HCl (equivalent to 0.8 parts of anhydrous HCl).
ᵇ After 2 hours, 0.8 part of concentrated H₂SO₄ added, making a total of 1.0 part.
ᶜ After 2 hours, 0.8 part of piperidine added, making a total of 1.0 part.

Experiments show:
(1) Aluminum chloride is the most powerful catalyst.
(2) Hydrated aluminum chloride is substantially equivalent to anhydrous aluminum chloride.
(3) The strong mineral acids effect isomerization very slowly.
(4) Piperidine is a less efficient catalyst in our preferred process than the strong mineral acids.

*Example 13*

To a solution of 2.0 parts of methyl maleurate in 30 parts of methanol was added 0.15 part of piperidine. There was a slight evolution of heat, and the solution became turbid within a few minutes. During the next 16 hours methyl N-carbamylfumaramate precipitated slowly. At the end of that time it was filtered, washed and dried as shown in Example 12. The yield was 40% of theory. Additional methyl N-carbamylfumaramate continued to precipitate very slowly from the filtrate.

This example shows that piperidine is operable, in a less preferred form of our invention, namely, in the isomerization of a previously isolated ester.

The cis N-carbamylamic esters used in our invention are made according to the method disclosed by Snyder and Tawney in their application, Serial No. 395,281, filed November 30, 1953.

Typical ones are shown in detail, as follows:

*Example A*

(1) A mixture of 203 parts of N-carbamylmaleimide and 320 parts of methanol was boiled under a reflux condenser for an hour. The solution was treated with decolorizing carbon and filtered while hot. It was then cooled to room temperature, causing the product to crystallize. After filtration and washing with alcohol the air-dried methyl N-carbamylmaleamate (methyl maleurate) was obtained in 80% yield (200 parts) as a white solid melting at 110–113° C. After recrystallization from methanol it melted at 113–114° C.

*Analysis.*—Calcd. for $C_6H_8N_2O_4$: nitrogen, 16.29%. Found: nitrogen, 16.36, 16.38%.

(2) When the preparation was repeated except that zinc chloride or ferric chloride was added to the mixture the reaction was completed within a few minutes without external heating. The temperature of the mixture rose above room temperature due to the exothermic reaction. The yield and purity of the methyl maleurate were substantially the same in the presence or absence of the catalyst.

*Example B*

Each of the following esters of maleuric acid was made by boiling N-carbamylmaleimide with excess of the respective alcohol as in Example A(1), except that the reaction time was varied as shown:

ESTERS OF MALEURIC ACID

| Alcohol | Ester Yield (percent) | Melting Pt. (° C.) | Reaction Time (Hrs.) | Nitrogen Analysis (percent) | |
|---|---|---|---|---|---|
| | | | | Calcd. | Found |
| 1. Ethanol | 70 | 111–112 | 2 | 15.05 | 14.84   15.01 |
| 2. 2-Propanol | 75 | 113–114 | 16 | 14.00 | 13.95   13.97 |
| 3. Ethylene glycol | ᵃ,ᵇ 60 | 131.0–131.5 | 2 | 13.85 | 13.59   13.71 |

ᵃ 2-hydroxyethyl maleurate.
ᵇ The reaction mixture was heated on the steam bath without reflux.

*Example C*

The following maleurate esters were made by boiling under reflux a mixture of N-carbamylmaleimide, the appropriate alcohol, zinc chloride, and about six volumes of p-dioxan per volume of the sum of the reagents, for a few hours. The zinc chloride was used in the proportion of about 3 parts per 100 parts of the N-carbamylmaleimide. Most of the dioxan was removed in vacuo, causing the desired ester to crystallize. The ester was purified by recrystallization from an appropriate solvent, as shown:

ESTERS OF MALEURIC ACID MADE IN DIOXAN

| Alcohol | Solvent of Recrystn. | Ester Yield (percent) | Melting Pt. (°C.) | Nitrogen Analysis (percent) | |
|---|---|---|---|---|---|
| | | | | Calcd. | Found |
| 1. 1-Butanol | CCl₄ | 47 | 95–99 | 13.09 | 13.25   13.33 |
| 2. 1-Dodecanol | ethanol | 40 | 110–111 | 12.15 | 12.23   12.23 |
| 3. 2-Nitro-1-butanol | dioxan+water | 50 | 106.5–108.2 | | |
| 4. Ethylene chlorohydrin | toluene | 66 | 116–119 | 12.68 | 12.62   12.84 |

*Example D*

A mixture of 1.96 parts of N-(n-butylcarbamyl)-maleimide, 108 parts of benzyl alcohol and 0.05 part of zinc chloride was heated at 85–90° C. for 30 minutes, and then was poured into ice water to precipitate the white benzyl N-(n-butylcarbamyl)-maleamate. After recrystallization from a mixture of ester and methanol it melted at 65.5–66.5° C. Yield 2.4 parts, or 78% of theory.

*Example E*

A mixture of 3.92 parts of N-(tert-butylcarbamyl)-maleimide, 2.16 parts of benzyl alcohol and 0.05 part of zinc chloride was treated like the mixture shown in Example D. The white benzyl N-(tert-butylcarbamyl)-maleamate melted at 70.0–72.5° C. Yield 5.5 parts, or 90% of theory.

*Example F*

A mixture of 4.32 parts of N-(phenylcarbamyl)-maleimide, 10 parts of isopropanol and 0.05 part of zinc chloride was heated at 75–85° C. for 2.5 hours. On cooling the mixture the white isopropyl N-(phenylcarbamyl)-maleamate crystallized. After recrystallization from isopropanol, it melted at 132–133° C. Yield 3.8 parts, or 71% of theory.

Typical trans N-carbamylamic esters which can be made by our process are methyl N-carbamylfumaramate, ethyl N-carbamylfumaramate, n-propyl N-carbamylfumaramate, isopropyl N-carbamylfumaramate, n-butyl N-carbamylfumaramate, sec-butyl N-carbamylfumaramate, isobutyl N-carbamylfumaramate, n-amyl N-carbamylfumaramate, n-hexyl N-carbamylfumaramate, n-heptyl N-carbamylfumaramate, n-octyl N-carbamylfumaramate, 2-ethylhexyl N-carbamylfumaramate, n-decyl N-carbamylfumaramate, n-dodecyl N-carbamylfumaramate, n-tetradecyl N-carbamylfumaramate, n-hexadecyl N-carbamylfumaramate, n-octadecyl N-carbamylfumaramate, allyl N-carbamylfumaramate, methallyl N-carbamylfumaramate, 2-hydroxyethyl N-carbamylfumaramate, 2-ethoxyethyl N-carbamylfumaramate, 2-chloroethyl N-carbamylfumaramate, benzyl N-carbamylfumaramate, 2-(N'-morpholino)-ethyl N-carbamylfumaramate, 2-nitrobutyl N-carbamylfumaramate, ethylene bis-(N-carbamylfumaramate), propylene bis-(N-carbamylfumaramate), trimethylene bis-(N-carbamylfumaramate), the bis-(N-carbamylfumaramate) of diethylene glycol, mono- and bis-(N-carbamylfumaramates) of alkyd resins having terminal hydroxyl groups, mono- and poly-(N-carbamylfumaramates) of castor oil, mono- and poly-(N-carbamylfumaramates) of "blown" oils, mono- and poly-(N-carbamylfumaramates) of cellulose, mono- and poly-(N-carbamylfumaramates) of starch, mono- and poly-(N-carbamylfumaramates) of glucose, mono- and poly-(N-carbamylfumaramates) of cellulose which has been partially esterified with carboxylic acids or their anhydrides, mono- and poly-(N-carbamylfumaramates) of sucrose, mono- and poly-(N-carbamylfumaramates) of cellulose which has been partially etherified, mono- and poly-(N-carbamylfumaramates) of polyvinyl alcohol, mono- and poly-(N-carbamylfumaramates) of partially hydrolyzed polyvinyl acetate, methyl N-carbamylmesaconamate, isopropyl N-carbamylmesaconamate, 2-ethylhexyl N-carbamylmesaconamate, n-octadecyl N-carbamylmesaconamate, allyl N-carbamylmesaconamate, 2-hydroxyethyl N-carbamylmesaconamate, benzyl N-carbamylmesaconamate, ethylene bis-(N-carbamylmesaconamate), methyl N-(methylcarbamyl)-fumaramate, isopropyl N-(methylcarbamyl)-fumaramate, methyl N-(n-butylcarbamyl)-fumaramate, isopropyl N-(n-butylcarbamyl)-fumaramate, benzyl N-(n-butylcarbamyl)-fumaramate, isopropyl N-(tert-butylcarbamyl)-fumaramate, isopropyl N-(tert-butylcarbamyl)-fumaramate, isopropyl N-(phenylcarbamyl)-fumaramate, benzyl N-(phenylcarbamyl)-fumaramate and n-propyl N-(phenylcarbamyl)-mesaconamate.

All of the aforesaid applications of Robert H. Snyder, Pliny O. Tawney, and Snyder and Tawney are owned by the present assignee of this application, and are concerned with covering different inventions than that herein claimed.

Having thus described our invention, what we claim and desire to protect by Letters Patent is:

1. A method of preparing esters of trans N-carbamylamic acids which comprises heating N-carbamylmaleimide, and a compound containing a non-tertiary alcoholic hydroxyl group in the presence of a cis-trans isomerizing agent selected from the class consisting of aluminum chloride, strong mineral acids, and non-tertiary amines.

2. A method of preparing esters of trans N-carbamylamic acids which comprises heating N-carbamylmaleimide, and a compound containing a non-tertiary alcoholic hydroxyl group in the presence of aluminum chloride.

3. A method of preparing non-tertiary alcohol esters of N-carbamylfumaramic acid which comprises heating the corresponding isomeric cis esters of non-tertiary alcohols in the presence of a cis-trans isomerizing agent selected from the class consisting of aluminum chloride, strong mineral acids, and non-tertiary amines.

4. A method of preparing non-tertiary alcohol esters of N-carbamylfumaramic acid which comprises heating the corresponding isomeric cis esters of non-tertiary alcohols in the presence of aluminum chloride.

References Cited in the file of this patent

UNITED STATES PATENTS

| | | |
|---|---|---|
| 2,306,905 | Valjavic | Dec. 22, 1942 |
| 2,576,895 | Adelson | Nov. 27, 1951 |

OTHER REFERENCES

Dunlop et al.: Am. Chem. J., vol. 19 (1897), p. 492.

Cavallito et al.: J. Am. Chem. Soc., vol. 63 (1941), pp. 995–8.

Rodd: "Chemistry of Carbon Compounds," Elsevier Publ. Co., New York (1952), vol. 1, part B, pp. 991–994.